Patented July 4, 1939

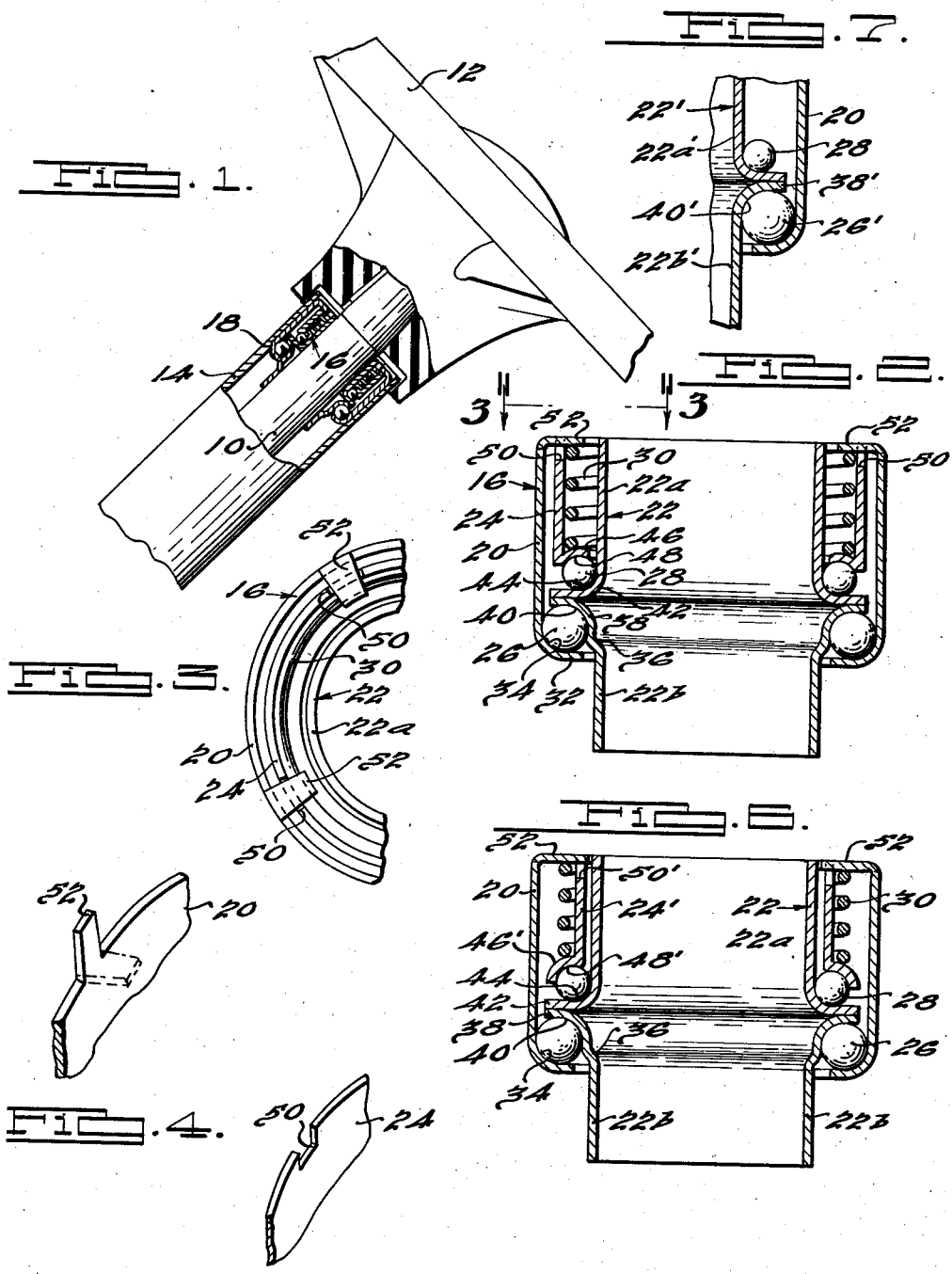

2,164,497

UNITED STATES PATENT OFFICE 2,164,497

STEERING COLUMN BUSHING

Jess D. Chamberlin, Detroit, Mich.

Application July 5, 1938, Serial No. 217,438

6 Claims. (Cl. 308—197)

This invention relates to steering column bushings for the steering gears of motor vehicles, the principal object being the provision of a bushing of the type described that is simple in construction, efficient in operation and relatively economical to produce.

Other objects of the invention include the provision of a steering column bushing that will effectively support the upper end of a steering shaft in a mast jacket and will effectively prevent rattling occurring between the parts; the provision of a bushing of the type described so constructed and arranged as to readily accommodate the parts thereof to slight mis-alignments between the steering post and the mast jacket without undesirably affecting the operability and efficiency of the bushing; the provision of a bushing of the type described including anti-friction elements between relatively rotatable parts thereof so constructed and arranged as to automatically take up any wear occurring between the parts; and the provision of a steering coumn bushing including anti-friction members and means for automatically taking up the wear occurring between the same and their races, that forms a unitary assemblage applicable to the steering column of a motor vehicle as such.

Other objects of the invention include the provision of a bearing element adapted for use between the upper end of a steering post and the steering shaft of a motor vehicle, as well as for other uses, including a pair of relatively rotatable sleeves arranged in telescoping relation with respect to each other, one of the sleeves being formed to provide a pair of opposed raceways, the other of the sleeves being formed to provide one cooperating raceway, and an additional cooperating raceway being provided in cooperating relationship with the remaining raceway of the first mentioned sleeve and being constantly yieldably urged toward the same, a plurality of rolling anti-friction elements being provided between opposed pairs of said raceways; the provision of a bearing of the type described including inner and outer sleeve-like members together with an intermediate sleeve-like member, all of said members being formed to provide two pairs of opposed raceways for reception of rolling anti-friction members therebetween, two of the sleeve-like members being arranged for equal rotation with each other and one thereof being constantly urged axially of the other thereof whereby to effectively eliminate play between the parts and, therefore, rattling of the same; the provision of a bearing of the type described having a novel means for locating two of the sleeve-like members with respect to each other; the provision of a bearing of the type described including novel means for locating one of the sleeve-like members with respect to the other thereof and further providing a stop for a coil spring incorporated therewith; the provision of a bearing of the type described in which one of the sleeve-like members providing a pair of races thereon is constructed in a novel manner; and the provision of a bearing of the type described that is simple in construction, efficient in operation and capable of being formed primarily from sheet metal.

The above being among the objects of the present invention the same consists in certain novel features of construction, and combinations of parts to be hereinafter described with reference to the accompanying drawing, and then claimed, having the above and other objects in view.

In the accompanying drawing which illustrates suitable embodiments of the present invention and in which like numerals refer to like parts throughout the several different views, Fig. 1 is a fragmentary, partially broken, partially sectioned side elevational view of the upper end of the steering gear for a motor vehicle, illustrating the same equipped with a steering column bushing constructed in accordance with the present invention and showing such bushing in section taken in a plane passing through the axis thereof;

Fig. 2 is an enlarged sectional view taken axially through the steering column bushing shown in Fig. 1;

Fig. 3 is a fragmentary plan view of the bushing shown in Fig. 2, taken as on the line 3—3 thereof;

Fig. 4 is a fragmentary perspective view of a portion of the upper edge of the outer sleeve of the bearing shown in Figs. 2 and 3 prior to bending over the ears or lugs employed for locking the intermediate sleeve against rotation and acting as a stop for the upper end of the compression spring;

Fig. 5 is a fragmentary perspective view of a portion of the upper edge of the intermediate sleeve, illustrating the manner in which the same is notched for reception of the ears or arms illustrated in Fig. 4;

Fig. 6 is a view similar to Fig. 2 but illustrating a slightly modified form of construction;

Fig. 7 is a fragmentary sectional view taken in the same plane as the views in Figs. 2 and 6 and illustrating a slightly modified form of construction applicable to either thereof.

Referring to the drawing and particularly to Fig. 1 the steering shaft of a motor vehicle is illustrated at 10 and as being provided at its upper end with a conventional steering wheel 12 fixed thereto in any suitable or conventional manner. The shaft 10 below the steering wheel 12 is surrounded by a steering post or mast jacket 14 arranged in generally radially spaced and concentric relation with respect thereto. Interposed between the upper end of the mast jacket 14 and the steering shaft 10 is a steering column bushing indicated generally at 16 and which forms the subject-matter of the present invention. The upper end of the mast jacket 14 is preferably internally reamed out for a sufficient distance to accommodate the bushing 16, such reaming leaving a shoulder 18 on the interior of the mast jacket which serves to limit the downward movement of the bushing 16 therein.

Referring now to Figs. 2 to 5, inclusive, it will be noted that the bearing 16 includes a generally cylindrical outer sleeve-like member or shell 20, an inner sleeve-like member or shell indicated generally at 22 telescopically received therein, an intermediate sleeve-like member or shell 24 telescopically received between the sleeves or shells 22 and 24, a row of ball bearings 26, a second row of ball bearings 28, and a compression spring 30. The lower end of the outer sleeve 20 is inwardly turned or flanged as at 32 to provide a curved raceway 34 for reception of the row of balls 26. The inner marginal edge of the portion 32 terminates radially outwardly of the outer surface of the inner sleeve-like member 22 which projects downwardly therethrough.

The inner sleeve 22 is preferably, although not necessarily, initially made up of two independently formed parts 22a and 22b, respectively, preferably, although not necessarily, permanently secured together as by welding or the like. The sleeve portion 22b is of a cylindrical nature throughout the greater part of its length but adjacent its upper end is outwardly offset as at 36 and then curved upwardly and outwardly as at 38 to provide a curved raceway 40 lying in opposed relation with respect to the raceway 34 and cooperating with the raceway 34 to receive the ball bearings 26 therebetween.

The portion 22a is preferably cylindrical as shown throughout the major portion of its length but its lower end is outwardly turned as at 42 to provide an outwardly and upwardly presented raceway 44 for reception of the row of ball bearings 28 which are of a smaller diameter than the ball bearings 26. The outwardly turned portions 38 and 42 of the sleeve portions 22b and 22a, respectively, are preferably, although not necessarily as previously explained, permanently secured together in concentric relationship as by welding or the like so as to form a rigid integral structure. It is only necessary that the internal diameter of one of the portions 22a and 22b be such as to fit the shaft 10, the other thereof being larger in such case, although both portions 22a and 22b may have the same internal diameter as shown in which case both fit the shaft 10.

The intermediate sleeve 24 is preferably of generally cylindrical nature throughout the greater portion of its length as indicated and its lower marginal edge portion is upwardly and inwardly bent as at 46 to provide a raceway 48 arranged in generally opposed relationship with respect to the raceway 44 and cooperating therewith to retain the ball bearings 28 therebetween. The inner marginal edge of the portion 46 of the sleeve 24 terminates radially short of and in surrounding relationship with respect to the sleeve portion 22a of the sleeve 22. The upper marginal edge of the intermediate sleeve 24 is, as best illustrated in Fig. 5, provided with at least two, and preferably three or four, notches 50 in its upper or axial edge, the notches 50 regardless of the number employed being preferably equally angularly spaced around such edge. As best illustrated in Fig. 4 the upper or axial edge of the outer sleeve 20 is initially provided with a plurality of axially projecting ears or lugs 52, equal in number and spacing to the notches 50 in the intermediate sleeve 24 and of a width preferably slightly less than the width of the notches 50. After assembly of the parts the ears 52 are adapted to be bent into radially inwardly directed relation as indicated in dotted lines in Fig. 4 and shown in full lines in Figs. 2 and 3 so as to engage in the corresponding notches 50 and thereby lock the outer sleeve 20 and intermediate sleeve 24 together against relative rotation but permitting axial movement of the sleeve 24 with respect to the outer sleeve 20. The notches 50 are preferably of materially greater depth than the thickness of the ears 52 so as to readily permit axial movement of the intermediate sleeve 24 with respect to the outer sleeve 20. Before the ears 52 are bent over as above described the coil spring 30 is assembled over the upper portion 22a of the inner sleeve 22 and within the intermediate sleeve 24 as indicated, its lower end abutting against the inturned lower edge 46 of the intermediate sleeve 24 which thus serves as a stop for one end of the spring. In its free state the spring 30 is of greater axial length than the length of the intermediate sleeve 24 and consequently during assemblage after the sleeve 24 has been inserted in place it is followed by the spring 30, the spring 30 is compressed and then the ears 52 are bent inwardly not only to prevent relative rotation between the sleeves 20 and 24 as described but to further provide a stop for the upper end of the spring 30 and thereby maintain the spring 30 under compression between the same and the portion 46 of the intermediate sleeve 24. This compression of the spring 30 not only causes the balls in both rows to be resiliently clamped between their respective races but when the sleeve portions 22a and 22b are not fixed together serves to resiliently hold their adjacent ends in abutting relationship.

It may be observed that in the embodiment shown the ball bearings 26 are of greater diameter than the ball bearings 28 although, as will be readily appreciated, the construction is susceptible to various changes whereby all the balls may be made of the same diameter if desired. However, as will be apparent, the employment of the ball bearings 26 and 28 are of different diameters facilitates for forming of the various parts of the bearing and eliminates certain manufacturing operations which would otherwise be necessary and, therefore, provides a means for economizing in the manufacture of the same.

It will be appreciated that with the bearing construction described the outer sleeve 20 and intermediate sleeve 24 comprise a unit in which the inner sleeve 22 is bodily rotatable because of its being mounted therein through the ball bearings 26 and 28. The spring 30 abutting at its upper end against the inturned ears or fingers 52 on the outer sleeve 20 and thus urging its inturned lower end 46 towards the inturned end 32 of the outer sleeve 20, resiliently clamps the ball bearings 26 and 28 between their respective pairs of races and consequently acts to constantly eliminate all play between these parts which might otherwise tend to cause rattling if permitted. All of the sleeves may be formed from sheet metal or thin walled tubing and particularly those portions thereof forming the races 34, 40, 44 and 48 may be readily case hardened or otherwise hardened to withstand the wear to which they may be expected to be subjected. All the sleeves are of relatively simple design capable of being economically produced with a minimum of simple die operations, and the design as a whole permits relatively easy assemblage of the various parts into a unitary assembly which is applicable as such to a steering column.

In Fig. 6 a slightly modified form of construction is illustrated and in which substantially the only modification is in connection with the intermediate sleeve. Accordingly, in Fig. 6 parts identical to those illustrated in Fig. 2 are indicated by the same numerals and parts corresponding thereto but modified from the construction illustrated in Fig. 2 are indicated by the same numerals except that such numerals bear a prime mark. Inasmuch as the only difference in the construction shown in Fig. 6 as compared to that shown in Fig. 2 is in connection with the intermediate sleeve 24', a description of these differences will be sufficient to explain the entire construction. The intermediate sleeve 24' in this case includes a cylindrical main body portion of smaller diameter than the intermediate sleeve 24 previously described and its lower end instead of being bent inwardly as at 46 is in this case bent outwardly and downwardly as at 46' to provide a raceway 48' in opposed relationship with respect to the raceway 44 and adapted to receive the ball bearings 28 between it and the raceways 44. The spring 30 in this case is received around the outside of the intermediate sleeve 24' but is maintained in compressed condition between the lower outwardly turned portion 46' thereof and the inwardly turned fingers 52 at the top thereof in substantially the same manner as previously described in connection with the construction shown in Fig. 2. It will, of course, be appreciated that the construction shown in Fig. 6 will function in a manner substantially identical to the construction illustrated in Fig. 2.

In Fig. 7 a slightly modified form of construction for the inner sleeve of either of the bearings shown in Figs. 2 and 6 is illustrated. The inner sleeve is generally indicated in Fig. 7 as at 22' and as comprising an upper portion 22a' and a lower portion 22b', the portion 22a' being identical to the portion 22a in Figs. 2 and 6 and the outer sleeve 20 being identical to the sleeves 20 previously described. In this case the lower inner sleeve portion 22b', instead of being outwardly offset as at 36 in the previously described construction, is turned directly from its main body portion into the outwardly turned portion 38' which is internally formed to provide the race 40' for reception of the ball 26. This modification of the previously described construction necessitates the use of a larger ball bearing 26' than in the previously described construction, but on the other hand eliminates the necessity of providing the offset 36. It will be appreciated that the modified form of construction illustrated in Fig. 7 is applicable to either of the constructions in Figs. 2 and 6.

It is desired to call attention to one feature of bearings constructed in accordance with the present invention as for instance those illustrated in the drawing. The construction is such, because of the yieldable nature between the various races and the ample clearance provided between the relatively rotatable parts, that the outer sleeve 20 and inner sleeve 22 may be assembled in a steering column with their axes slightly skewed or cocked with respect to each other. This is a desirable feature for the reason that with the degree of accuracy which is sometimes found in the associated parts of the steering column, and the relative tolerances which are permitted between these parts, such cocking or skewing is not at all uncommon and unless the relatively rotatable parts of the bearing are designed to permit a corresponding skewing thereof without binding, an unsatisfactory assemblage might occur under such conditions.

Formal changes, such for instance as the reversing of the inner and outer sleeves of the construction shown and described and modifications and rearrangements of the various parts shown and described, may be made in the specific embodiments of the invention described without departing from the spirit or substance of the broad invention, the scope of which is commensurate with the appended claims.

What I claim is:

1. In a bushing for use between the shaft and mast jacket of a vehicle steering gear, in combination, an inner sleeve member and an outer sleeve member, one of said sleeve members being provided with a pair of oppositely facing raceways, the other of said sleeve members having a raceway lying in opposed relationship with respect to one of said pair of raceways, an intermediate member providing a fourth raceway in opposed relation with respect to the remaining of said pair of raceways, anti-friction elements positioned between each opposed pairs of said raceways, and means constantly urging said intermediate member in a direction to cause said raceways to resiliently grip said anti-friction elements therebetween.

2. In a bushing for use between the steering shaft and mast jacket of a motor vehicle, in combination, an inner sleeve member, an outer sleeve member, an intermediate sleeve member, all of said sleeve members being arranged in telescoping relation with respect to each other, one of the first two mentioned sleeve members being formed to provide a pair of oppositely directed bearing races arranged in back-to-back relationship, the remaining sleeve members each being formed to provide a single raceway each of which is positioned in opposed relationship with respect to one of said pair of raceways, anti-friction elements interposed between each opposed pair of raceways, and resilient means cooperating between said remaining sleeve members constantly urging the raceways thereof toward one another.

3. A bearing element adapted for reception between the steering shaft and the steering post of a motor vehicle comprising, in combination, a sleeve member provided with an annular generally radially directed portion forming a pair of raceways arranged in back-to-back relationship, a second sleeve member arranged in telescoping relation with respect to the first mentioned sleeve member and having a generally radially directed portion at one end thereof providing a raceway lying in opposed relation with respect to one of said pairs of raceways, a third member interposed between said sleeve members and having a raceway lying in opposed relation with respect to the remaining of said pairs of raceways, means locking said second sleeve member and said third member together against relative rotation and permitting a limited amount of axial movement between them, spring means interposed between said second sleeve member and said third member constantly urging the races thereof toward one another, and anti-friction elements interposed between the first mentioned pairs of raceways and the raceways of said second sleeve member and said third member.

4. A bushing adapted for insertion between the steering post and steering shaft of a motor vehicle including, in combination, an inner sleeve member and an outer sleeve member, one of said sleeve members being formed to provide a pair of raceways arranged in back-to-back relationship, the other of said sleeve members being formed to provide a raceway lying in opposed relation with respect to one of said pair of raceways, anti-friction elements between the last mentioned raceway and the cooperating of said pair of raceways, a third sleeve member interposed between the first two mentioned sleeve members and providing a fourth raceway lying in opposed relation with respect to the other of said pairs of raceways, anti-friction elements between the last mentioned raceway and said other of said pairs of raceways, means integral with said other of said sleeve members overlying an end of said third sleeve member, and resilient means maintained under compression between said means and said third sleeve member.

5. A bushing adapted for insertion between the steering post and steering shaft of a motor vehicle including, in combination, an inner sleeve member and an outer sleeve member, one of said sleeve members being formed to provide a pair of raceways arranged in back-to-back relationship, the other of said sleeve members being formed to provide a raceway lying in opposed relation with respect to one of said pair of raceways, anti-friction elements between the last mentioned raceway and the cooperating of said pair of raceways, a third sleeve member interposed between the first two mentioned sleeve members and providing a fourth raceway lying in opposed relation with respect to the other of said pairs of raceways, anti-friction elements between the last mentioned raceway and said other of said pairs of raceways, said third sleeve member having notches formed in an end thereof, inwardly bent fingers on the corresponding end of said other of said sleeve members inter-engaged in said notches, and spring means maintained under compression between said fingers and said third member constantly urging the third and fourth mentioned raceways towards one another.

6. A bushing for use between the steering shaft and the steering column of a motor vehicle comprising, in combination, a pair of sleeve members each radially flanged at one end thereof to provide a raceway and rigidly secured together at said radially flanged ends, a third sleeve member arranged in telescoping relation with respect to the first two mentioned sleeve members, an inturned end on said third sleeve member providing a raceway lying in opposed relation with respect to one of the two first mentioned raceways, a fourth sleeve member arranged intermediate of and in telescoping relation with respect to one of the two first mentioned sleeve members and said third mentioned sleeve member, a radially directed portion at one end of said fourth sleeve member providing a raceway arranged in opposed relation with respect to the other of the first two mentioned raceways, anti-friction elements interposed between each opposed pair of said raceways, and spring means co-acting between said third sleeve member and said fourth sleeve member constantly urging the races thereof toward one another.

JESS D. CHAMBERLIN.